United States Patent [19]

Linden et al.

[11] Patent Number: 5,326,514
[45] Date of Patent: Jul. 5, 1994

[54] PROCESS FOR THE PRODUCTION OF HOLLOW BODIES OF THERMOPLASTIC MATERIAL AND HOLLOW BODIES PRODUCED BY THAT PROCESS

[75] Inventors: Günter Linden, Bonn; Detlef Vogeley; Klaus Esser, both of Königswinter, all of Fed. Rep. of Germany

[73] Assignee: Kautex Werke Reinold Hagen AG, Bonn, Fed. Rep. of Germany

[21] Appl. No.: 13,596

[22] Filed: Feb. 4, 1993

[30] Foreign Application Priority Data

Feb. 8, 1992 [DE] Fed. Rep. of Germany ....... 4203705

[51] Int. Cl.$^5$ ............ B29C 49/20; B29C 49/46
[52] U.S. Cl. .................... 264/83; 264/516; 264/526; 156/245; 280/830
[58] Field of Search .......... 264/83, 512, 515, 516, 264/526; 156/245; 280/830

[56] References Cited

U.S. PATENT DOCUMENTS

| 3,954,369 | 5/1976 | Körmendi | 264/516 |
| 4,305,416 | 12/1981 | Henning et al. | 137/38 |
| 4,617,077 | 10/1986 | Giese et al. | 156/245 |
| 4,719,072 | 1/1988 | Kojima et al. | 264/515 |

FOREIGN PATENT DOCUMENTS

| 0176044 | 4/1986 | European Pat. Off. | |
| 2936318 | 3/1981 | Fed. Rep. of Germany | |
| 3042926 | 3/1982 | Fed. Rep. of Germany | |
| 3223081 | 10/1983 | Fed. Rep. of Germany | |
| 56-075832 | 6/1981 | Japan | 264/516 |
| 61-225027 | 10/1986 | Japan | 264/516 |
| 4-091923 | 3/1992 | Japan | 264/516 |
| 80/00326 | 3/1980 | PCT Int'l Appl. | 264/516 |

OTHER PUBLICATIONS

European Search Report for Application No. EP 93100355.2 (2 pages).

*Primary Examiner*—Catherine Timm
*Attorney, Agent, or Firm*—Panitch Schwarze Jacobs & Nadel

[57] ABSTRACT

In a process for the production of hollow bodies from thermoplastic material by blow molding, an additional body is disposed inside the hollow body by being carried on a holding means which is joined to the inside surface of the wall of the hollow body. The additional body is disposed on the holding means at a spacing from the inside surface of the wall of the hollow body while that surface is subjected to a treatment with a treatment medium, so that the treatment medium has adequate access to the wall of the hollow body in the region of the additional body. After termination of the treatment the additional body is then moved on the holding means into a final position in which it is disposed at least closely adjacent to or in contact with the inside surface of the wall of the hollow body.

32 Claims, 7 Drawing Sheets

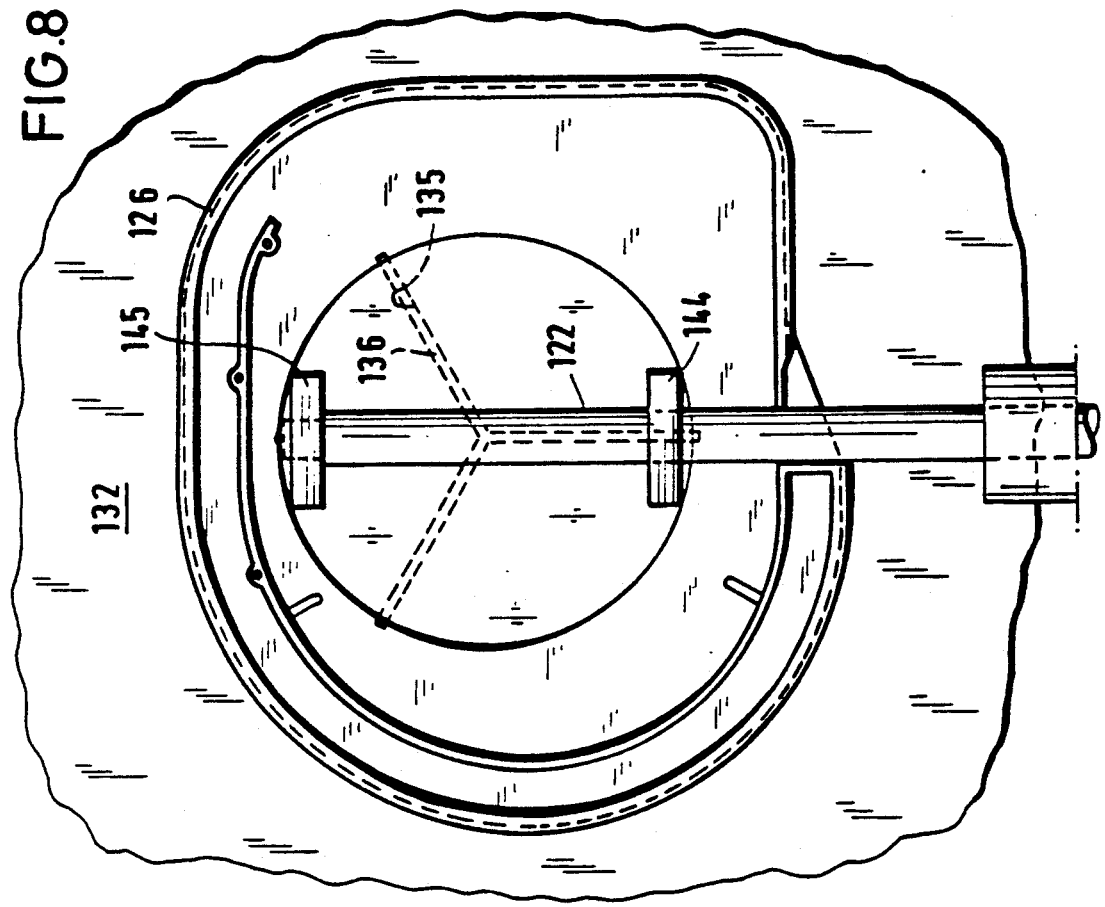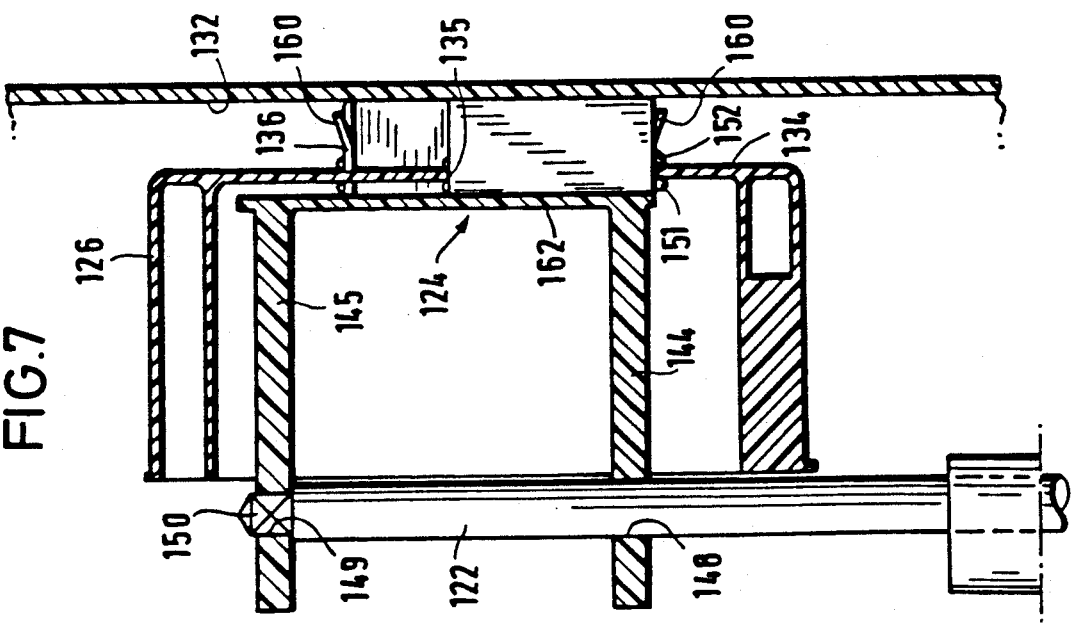

PROCESS FOR THE PRODUCTION OF HOLLOW BODIES OF THERMOPLASTIC MATERIAL AND HOLLOW BODIES PRODUCED BY THAT PROCESS

BACKGROUND OF THE INVENTION

It is a well-known procedure for hollow bodies to be produced from thermoplastic material by blow molding, wherein a preform which is for example of a tubular configuration is formed and expanded within a blow molding mold by an increased internal pressure therein, until it bears against the wall of the blow molding mold. Some situations however involve the need for an additional body to be disposed in the interior of the hollow body which is produced by that blow molding procedure, for example typical situations of use in that respect being motor vehicle tanks which, if they are made from plastic material, are predominantly produced by an extrusion blow molding procedure. The additional body may be a surge cup or pot which is disposed in the lower region of the tank and which is intended in particular to ensure that sufficient fuel is always available in the region of the intake opening leading to the fuel pump, irrespective of forces acting on the fuel in the tank, for example when the vehicle in which the tank is fitted is negotiating a bend, thus being subjected to centrifugal forces.

In the majority of procedures for disposing an additional body in the interior of a hollow body produced by blow molding, upon extrusion of the preform, the latter is passed over the additional body which is supported by a carrier element, whereupon, upon closure of the blow molding mold which is generally in two parts around the preform, the additional body is enclosed within the preform which, at that time, has generally already been subjected to preliminary expansion. Such preforms are predominantly of a tubular configuration, so that reference may be specifically made hereinafter to tubular preforms, although it will be appreciated that the teaching of the present invention can also be readily applied to preforms of different configurations.

After the preform has been expanded into the configuration of the hollow body to be produced therefrom, the additional body is joined to the internal surface of the wall of the hollow body. That is generally effected by the additional body being welded or heat-sealed to the wall of the hollow body. The additional body at least partly comprises a material which is weldable to the material forming the hollow body. Such a welded joint can be made for example when the hollow body and the additional body at the join locations comprise polyolefins, for example polyethylene. For that purpose, at the moment of producing the join between the additional body and the wall of the hollow body, those components must still be hot and plastic, that is to say in a condition which permits a welded join to be produced therebetween.

As indicated above, a typical additional body which is to be fitted into a hollow body is a surge cup or pot provided in the interior of a motor vehicle fuel tank and intended to ensure that fuel is retained in the region of the intake opening leading to the fuel pump, thereby to ensure that fuel is always available to the pump. In such a situation, the intake opening for the fuel line leading to the fuel pump is generally disposed in the surge pot which in substance comprises a bottom portion and wall regions which extend therefrom generally perpendicularly to the bottom portion but which are provided with openings for the fuel to pass therethrough, into the surge pot. The surge pot is generally open at its side remote from the bottom portion. Surge pots of that kind are generally known and will therefore not be described in greater detail at this point.

As the walls of fuel tanks which comprise a polyolefin such as more particularly polyethylene are permeable at any event in relation to those hydrocarbons which are contained in liquid fuels, the usual practice is for the wall of the fuel tanks to be exposed to a reactive gas, prior to use of the tank. The reactive gas used in that situation is generally a fluorine-bearing gas mixture which is blown into the hollow body and which results in reaction of the internal surface layer of the wall consisting of polyethylene or the like, with the result that that surface layer and therewith the wall generally becomes almost impermeable in relation to hydrocarbons, or at any event is of such a low degree of permeability that the hydrocarbons which still pass through the wall of the tank are insignificant in quantitative terms.

Hitherto the procedure for the production of a hollow body with an additional body mounted therein is generally such that, after the preform expansion operation, the additional body is firstly joined to the wall of the hollow body, whereupon the treatment with fluorine or another treatment for reducing the level of permeability in relation to hydrocarbons is then carried out. That means that the region of the inside surface of the wall at which the additional body is mounted is shielded from the reaction medium by the additional body, so that that region which is shielded during the treatment with the reaction medium experiences no or only slight reaction of the surface layer of the wall of the hollow body and the degree of permeability of that region therefore remains at least substantially unchanged. That disadvantageous effect could possibly be at least reduced in some areas, that is to say where the additional body does not bear against the wall of the hollow body, by arranging for the reaction medium to act for a longer period of time. That however would result in the treatment time being increased, giving rise to a correspondingly lower level of productivity.

Such a procedure suffers from disadvantages in particular when using a conventional surge pot or cup in a motor vehicle fuel tank, as the cup or pot is generally provided with a bottom portion of large area, which boars directly against the inside surface of the wall of the hollow body and thus covers a correspondingly large region thereof and causes that region to remain untreated by the reaction medium. Admittedly, that untreated region of the wall of the hollow body does not necessarily result in its being permeable in relation to hydrocarbons, which would make it impossible for the hollow body to be used as a tank, especially as the presence of the bottom portion of the surge cup or pot in that region means that the total wall configuration at that location, being constituted by the wall of the hollow body plus the bottom portion of the surge cup or pot, is thicker than in the remainder of the tank. However, the absence of surface treatment in that region means that in use of the tank, in the course of time, hydrocarbons from the fuel contained in the tank can penetrate into that region of the wall of the tank. The result of that inter alia is that the regions of the wall of the tank through which the hydrocarbons pass may experience a certain degree of deformation, for example due to swelling thereof. The degree of such deformation does not need to be very great but at any event it gives rise to the occurrence of stresses in the wall, which are undesirable and which can also result in deformation of all regions of the tank; such deformation can also produce an effect right up to the additional body, causing a change in the position thereof in the tank, so that operational components in the additional body may under some circumstances be affected in a manner such as to impair proper functioning thereof. It will be appreciated that the above-mentioned hydrocarbons may also penetrate into the bottom and wall regions of a surge pot or cup which comprises for example polyethylene, and may also cause swelling at those locations. That however is of no significance in relation to the surge cup or pot as it is not subjected to high mechanical loadings and in addition is arranged within the tank. Admittedly the reaction medium for treating the internal surface of the tank also acts on the surge pot or cup—or any other additional body disposed within a hollow body—, although without producing the effects on the surfaces of the additional body, which occur at the internal surface of the hollow body. That is in substance to be attributed to the consideration that the additional body is at a substantially lower temperature than the wall of the hollow body, which is still hot and plastic. The temperature of the surfaces to be treated in the above-described manner represents an essential requirement in regard to achieving the desired effect.

SUMMARY OF THE INVENTION

An object of the present invention is to provide a process for the production of a hollow body of thermoplastic material by blow molding with an additional body disposed therein, which does not suffer from the above-discussed disadvantages.

Another object of the present invention is to provide a process for the production of a hollow body of thermoplastic material by blow molding with an additional body carried therein without in that respect having to pay any particular heed to additional governing factors such as choice of material, positioning and the like.

Still another object of the present invention is to provide a process for the production of a hollow body by blow molding with an additional body fixed therein which is not subjected to additional limitations in comparison with prior processes and which does not involve a fall in productivity.

Still a further object of the present invention is to provide a process for the production of a hollow body of thermoplastic material by blow molding from a preferably tubular preform with an additional body disposed therein and fixed to the inside surface of the wall of the hollow body, which gives operationally satisfactory results while still being simple to perform from the operating procedure point of view.

Yet a further object of the present invention is to provide a hollow body by blow molding from a preform having in its interior an additional body which is securely fixed in position therein.

In accordance with the principles of the present invention, the foregoing and other objects are achieved by a process for the production of hollow bodies of thermoplastic material by blow molding, wherein a preform which is preferably tubular is expanded within a mold by an increased internal pressure until it bears against the wall of the mold, and an additional body is introduced into the preform which has at least one opening for that purpose, to be applied to the inside surface of the wall of the expanded hollow body. At least portions of the surface of the wall of the hollow body are treated with at least one medium with which the plastic material forming the regions of the wall of the hollow body that are to be treated reacts to change physical and/or chemical properties of the treated regions. The medium or agent may be a constituent of a mixture. The additional body is introduced with a holding means into the preform and, prior to treatment of the hollow body with the reaction medium, the holding means is joined to the wall of the hollow body. The additional body is firstly held in a first position on the holding means in which it is at a spacing from the wall region of the hollow body to which it is to be connected. That spacing is selected to be large enough to permit substantially unimpeded access for the treatment medium to the region between the additional body and the adjoining wall of the hollow body. After a sufficient period of action of the treatment medium, the additional body is displaced relative to the holding means into a second position in which it is disposed at a smaller spacing from or is in a condition of bearing against the wall region of the hollow body to which the holding means has been connected. The contact surface area or areas between the holding means and the inside surface of the wall of the hollow body is or are substantially smaller than the projection of the additional body on to the region of the wall of the hollow body in which the holding means is disposed.

In accordance with another aspect of the present invention the foregoing and other objects are achieved by a hollow body produced by a blow molding process from thermoplastic material and having an inside surface which has been treated at least in portions thereof with a reaction gas, with an additional body disposed within the hollow body at the wall thereof. The additional body is carried by a holding means connected to the wall of the hollow body in wall regions which have not been subjected to the reaction gas treatment.

As will be seen in greater detail hereinafter, in the production process according to the invention, prior to the hollow body being treated with the reaction medium, the procedure involves mounting to the inside surface of the wall of the hollow body only a holding means carrying the additional body which however is additionally held at a spacing from the region of the wall of the hollow body to which it is to be joined, so that the treatment medium such as a reaction gas can also pass into the region between the additional body and the hollow body wall, which is subsequently partly or completely covered by the additional body or at least screened thereby. It is only after sufficient treatment with the reaction medium that the additional body is displaced relative to the holding means into its final position and fixed in that position by suitable means. While the process in accordance with the invention provides that the inside surface of the wall of the hollow body admittedly still has regions which are covered by the parts of the holding means which are joined to those regions, during the treatment with the reaction or treatment medium, so that at those locations there is only little or no reaction with the reaction medium, those regions are nonetheless of small extent in terms of surface area so that they do not give rise to adverse effects, for example they are of such a small size that any swelling of the material which may be caused by hydrocarbons penetrating into those regions when the hollow body is a motor vehicle fuel tank does not have any noticeable influence on the quality of the finished hollow body or tank.

When using the process according to the invention, a fixed direct joint between the additional body and the wall of the hollow body will not occur even when displacement of the additional body from the first position into the final position occurs at a time at which the wall of the hollow body is still in a hot plastic condition as the treatment which has been carried out prior to that, using the reaction medium, means that a welded joint and generally also an adhesive joint between the wall of the hollow body and the additional body cannot be made, or at any event not with the required strength. However, there is no need for such a joint as the holding means can easily be of such a configuration and so mounted to the wall of the hollow body that a firm connection is produced between the holding means and the wall of the hollow body, so that the only important consideration is then for the additional body to be fixed on the holding means in its final position in a sufficiently reliable fashion.

A further major advantage of the invention is that the choice of material for the additional body is not subject to any limitations as the additional body is no longer secured to the wall of the hollow body directly by means of welding, hot-adhesive or the like, but is carried by the holding means and only needs to be suitably mechanically connected thereto. It is therefore easily possible for example to provide a fuel tank of plastic material with a surge pot or cup which comprises steel sheet.

In addition, when using the process according to the invention, there is no need for the additional body to be positioned in its final position in direct contact against the wall of the hollow body. On the contrary, it is also possible for the additional body to adopt a final position in which it is disposed at a small spacing from the wall of the hollow body, although it will often be more desirable for the additional body actually to bear against the wall of the hollow body.

Displacement of the additional body out of its first position into its second or final position can occur while the hollow body is in the blow molding mold when still in the closed condition. It is also possible however for such displacement to occur at a time at which the hollow body has already been removed from the blow molding mold and for example completion operations are being carried out thereon. In that respect, in many situations, in particular when dealing with fuel tanks, it is necessary for the hollow body to be provided with an additional opening. It is possible for displacement of the additional body to be effected then after that additional opening has been provided. In that respect it may be noted that, in the case of fuel tanks, such an additional opening frequently is to be or can be disposed approximately opposite the above-mentioned surge pot or cup.

Further objects, features and advantages of the present invention will be apparent from the following description of preferred embodiments.

BRIEF DESCRIPTION OF THE DRAWINGS

FIG. 7 is a view corresponding to that shown in FIG. 4 of a second embodiment, FIG. 8 is a plan view on to FIG. 7.

DESCRIPTION OF PREFERRED EMBODIMENTS

Figure 1:
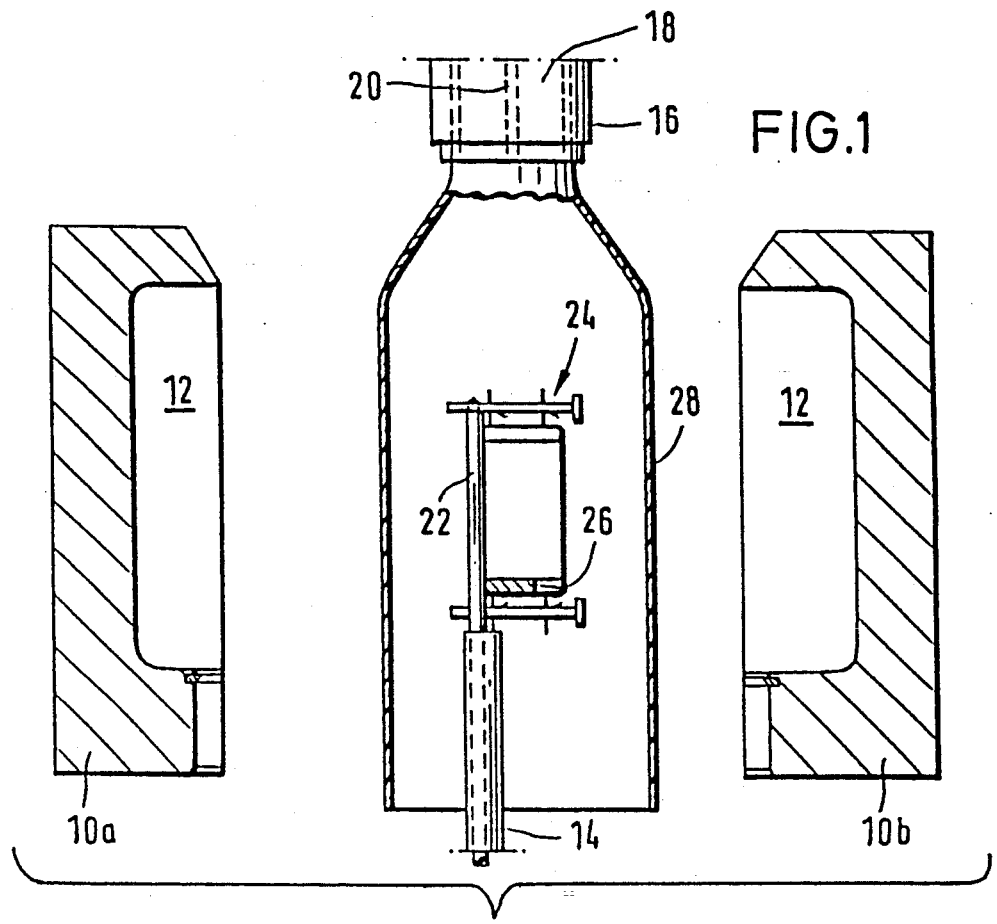
FIGS. 1-3 are each a partly sectional side view of an apparatus for the production of hollow bodies, showing three successive stages in the production process.
Figure 2:
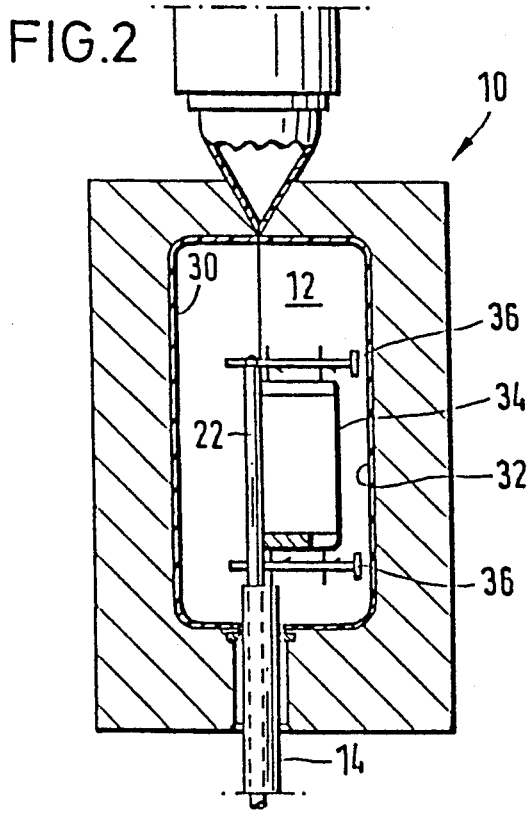
Figure 3:
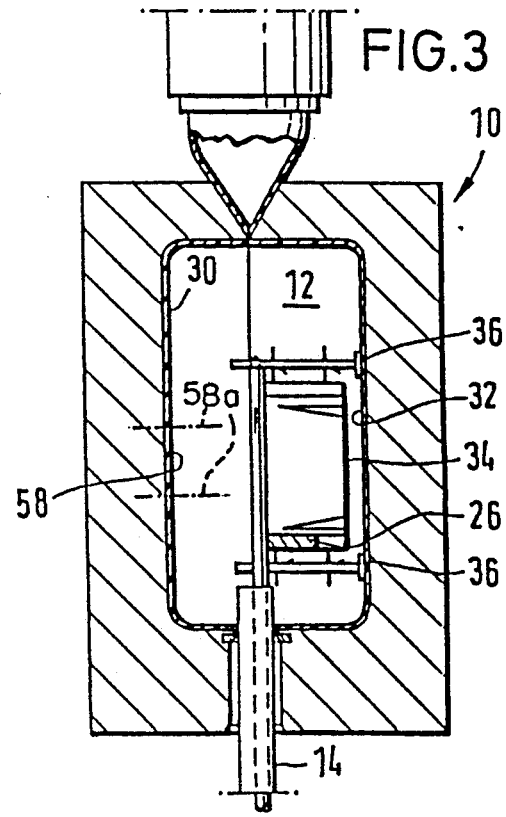

Referring firstly to FIGS. 1 through 3, an apparatus for carrying out a process for the production of hollow bodies of thermoplastic material by blow molding in accordance with the invention comprises a generally two-part blow molding mold which is indicated generally at 10 and which comprises two blow molding mold halves 10a and 10b. Associated with the blow molding mold 10 is a mandrel 14 which projects from below between the two halves 10a, 10b into the mold cavity 12 defined by the mold in the closed condition.

The apparatus further has an extrusion device with an extrusion head as indicated at 16 which, when producing a preform which is preferably tubular has an annular discharge opening for the thermoplastic material for forming the preform. That annular discharge opening is defined at its inward side by a core 18 provided with a downwardly open passage 20 for a gaseous medium.

The mandrel 14 may be provided with axial passages (not shown) which are arranged for example coaxially relative to each other and of which one passage serves for the feed of a pressure medium and the other passage serves to feed a reaction medium such as a reaction gas. In that respect attention is directed for example to EP-A-0 176 044 and corresponding U.S. Pat. No. 4,617,077 describing and illustrating details of the blow molding procedure and also possible configurations in regard to matters related to the feed of pressurised expansion medium and reaction gas.

At its end which projects into the blow molding mold 10 the mandrel 14 is provided with a rod-like extension 22 which however is of markedly smaller diameter than the mandrel 14. The extension 22 is arranged eccentrically on the mandrel 14, in parallel relationship therewith, so that rotary movement of the rotatably mounted mandrel 14 abut its longitudinal axis results in a corresponding swivelling or nutating movement of the extension 22 abut the longitudinal axis of the mandrel 14. During production of a preform or hollow body, the extension 22 serves as a support element for a holding means 24 which in turn carries an additional body 26 which is to be mounted to the hollow body to be produced in the blow molding mold 10, in the interior of the hollow body.

Referring firstly to FIG. 1, the working cycle for the production of a hollow body begins when the blow molding mold is in the open condition shown in FIG. 1, with the operation which will be described in greater detail hereinafter, of fitting the holding means 24 on the extension 22 serving as the carrier element, with the components initially being in the position shown in FIG. 1. In other words, the mandrel 14 has first been rotated into a position in which the extension 22 is at the left-hand apex (in FIGS. 1 through 3) of the circular path which the extension 22 would describe when the mandrel 14 is rotated through 180°. Thus, the extension 22 is here in its position in which it is furthest towards the left in for example FIG. 1. At that stage in the process, with the blow molding mold halves 10a, 10b moved away from each other, a preform 28 is now extruded between the mold halves 10a and 10b from the extrusion head 16, which, as indicated above, is open at its lower end. The preform 28 is of a tubular configuration but it can also be of other forms, for example it may comprise a band or strip which is bent substantially in a U-shape in cross-section or it may comprise two bands or strips which are joined together when the mold 10 is closed.

FIG. 1 shows that the preform 28 is of a diameter which permits it to be guided during the extrusion procedure by means of a relative movement over the holding means 24 with additional body 26, carried by the extension 22. During the step of extruding the preform 28, a gas is normally introduced through the passage 20 into the preform 28. That gas can cause a certain degree of preliminary expansion of the preform 28, although the increased pressure which obtains in the preform 28 in that situation is low by virtue of the fact that the preform 28 is still open downwardly. As soon as the preform 28 has reached its length which is required for the production of a hollow body and which approximately corresponds to the length shown in FIG. 1, the mold 10 is closed by suitable displacement of the two mold halves 10a and 10b from the positions shown in FIG. 1 into the positions shown in FIGS. 2 and 3. When that happens, the preform 28 is separated at its upper end by the two mold halves 10a and 10b from the material which is still hanging from the extrusion head 16, by virtue of the two mold halves 10a and 10b applying a squeezing effect to the preform 28 at a position beneath the extrusion head 16, whereby the preform 28 is also closed off at its upper end. At its lower end the preform 28 is pressed around the mandrel 14 by virtue of closure of the mold halves 10a and 10b, and excess material is possibly also squeezed off. That procedure involves matters which are familiar to any man skilled in the extrusion blow molding art so that the steps involved do not need to be particularly described in detail herein.

Shortly before or after termination of the operation of closing the blow molding mold 10, the actual blowing operation is begun. For that purpose, firstly a suitable blowing agent such as inert gas is introduced under pressure by way of the passage in the mandrel 14 into the preform 28 which, as indicated above, has possibly already been subjected to preliminary expanson, with the result that the preform 28 is caused to bear everywhere against the inside wall defining the mold cavity 12 and thus assumes the configuration thereof, which essentially corresponds to the configuration of the hollow body to be produced, as indicated at 30 in FIGS. 2 and 3. It can be seen from FIG. 2 of the drawing that, by virtue of the selected position of the mandrel 14 in the peripheral direction, the holding means 24 and therewith the additional body 26 carried thereby are disposed in this stage of the process at a spacing from the wall region 32 of the hollow body 30, to which the additional body 26 is to be mounted, that wall region 32 being at the right in the views shown in FIGS. 2 and 3. It will be noted from FIGS. 1 through 3 that the additional body 26 is of a generally pot-like or cup-like configuration having a bottom portion as indicated at 34. In the FIG. 2 position, the spacing between the bottom portion 34 of the additional body 26 and the wall region 32 of the hollow body 30 is so great that a treatment medium within the hollow body 30 has unimpeded access even to that wall region 32 at any time. The spacing of the additional body 26 from the other wall regions of the hollow body is in any case so great that a medium flowing within the hollow body 30 has unimpeded access thereto throughout.

As soon as possible after the termination of the preform expansion step, the mandrel 14 is turned through 180° about its longitudinal axis. That results in a corresponding swivelling movement of the extension 22 serving to carry the holding means 24 and the additional body 26, with the result that, in the course of that movement, the holding means 24 with additional body 26 is displaced from the position shown in FIG. 2 into the position shown in FIG. 3, that is to say, towards the right in those Figures. The degree of eccentricity of the extension 22 relative to the center line of the mandrel 14 is so selected that, at the end of the swivel movement of the extension 22, the enlarged foot portions 36 of the holding means 24, which face towards the wall region 32 of the hollow body 30, come into contact with the wall region 32 under a certain pressure and are thus welded thereto, forming a firm joint between the holding means 24 and the wall region 32. That position of the holding means 24, in which a firm and strong joint is made between the wall region 32 and the holding means 24, is illustrated in FIG. 3. As, in the swivel movement performed by the extension 22, the holding means 24 with the additional body 26 carried thereby are always intended to adopt positions which are parallel to a plane defined by the FIG. 2 starting position of the holding means 24 and the additional body 26, the extension 22 is mounted rotatably about its longitudinal axis relative to the mandrel 14, in the mandrel, with means (not shown) being provided to fix the angular position of the extension 22 relative to its longitudinal axis. In other words, the angular position of the extension 22 and therewith the holding means 24 and the additional body 26 carried by the latter remain unchanged during the pivotal movement of the extension 22. That fact provides for the above-mentioned displacement in which the holding means and the additional body always occupy a position which is parallel to their starting position.

After the joint has been made between the holding means 24 and the inside surface of the wall region 32 of the hollow body 30, the treatment medium such as a gas is then blown into the hollow body 30 by way of the mandrel 14 or other suitable feed device. The treatment medium results in the above-mentioned reaction at the inside surface of the wall 32 of the hollow body 30. It can be seen from FIG. 3 that the additional body 26 is so spaced from the wall of the hollow body 30, at all sides, that the treatment medium has unimpeded access to all wall regions and in particular also the wall region 32 which is disposed in oppositely facing relationship to the bottom portion 34 of the additional body 26. After the treatment step has been concluded, the additional body 26 is displaced from the position shown in FIG. 3 into the position illustrated in FIG. 5 in which the bottom portion 34 of the additional body 26 bears against the inside surface of the wall of the hollow body 30 in the wall region 32. That operation of displacing the additional body 26 into its final position may be effected inside or outside the blow molding mold.

Figure 4:
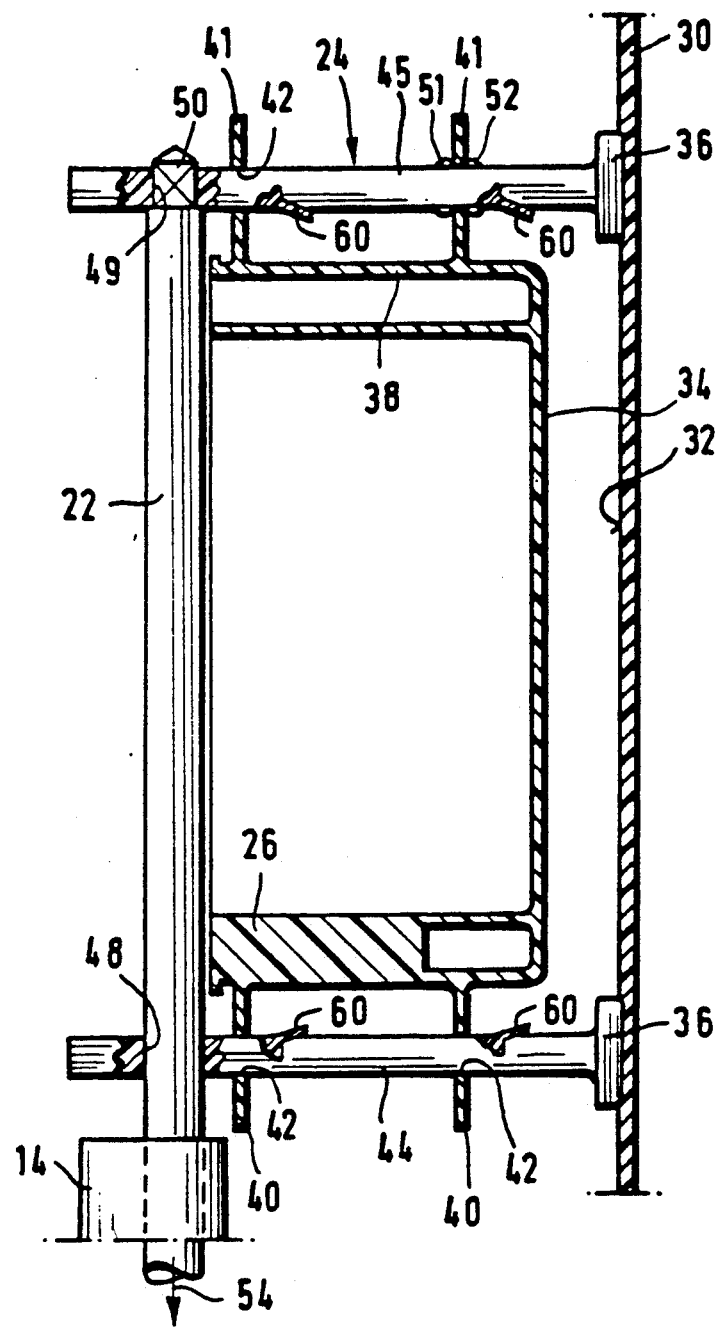
FIG. 4 shows a portion from FIG. 3 on a larger scale.
Figure 6:
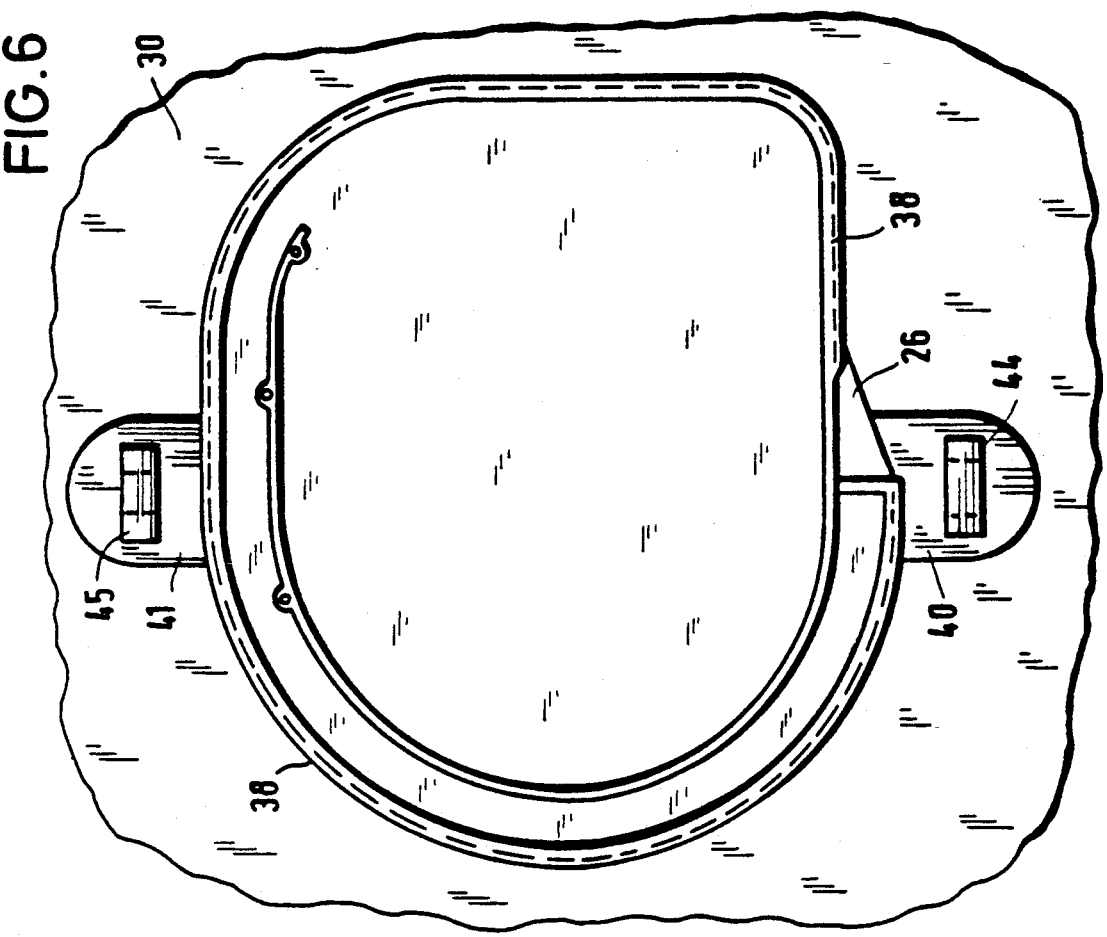
FIG. 6 is a plan view of the FIG. 5 situation.
Figure 5:
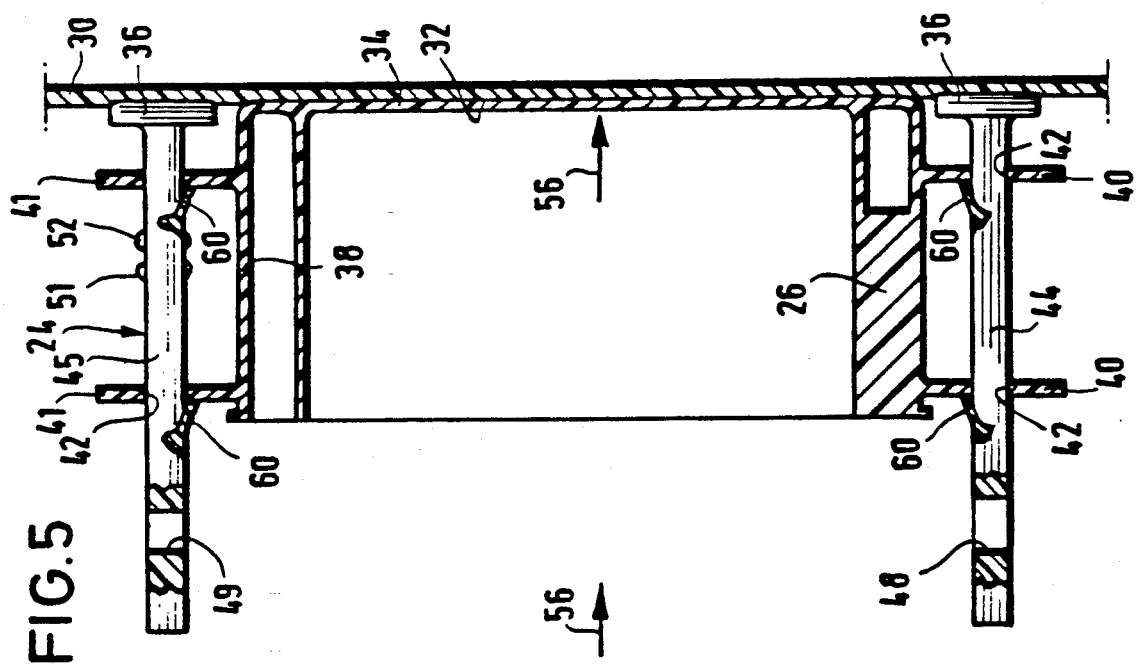
FIG. 5 is a view corresponding to FIG. 4 but showing the additional body in the final position.

Reference will now be made to FIGS. 4 through 6 showing further details of the configuration of the holding means 24 and the additional body 26 carried thereon. The additional body 26 which is of a generally cup-like or pot-like configuration, being for example a surge cup or pot for a motor vehicle fuel tank, has the abovementioned bottom portion 34 and side walls 38 and fitments which are disposed within the cup shape but which are of no importance from the point of view of the present invent ion and which depend on the respective requirements and operational parameters involved. For that reason, such fitments will not be described in detail herein.

At two approximately mutually oppositely disposed sides the additional body 26 is provided with two projections 40, 41 at each side, which projections extend approximately parallel to the bottom portion 34 and the wall region 32 of the hollow body 30, and have openings 42.

The projections 40 and 41 with the openings 42 serve as guide means for guiding the additional body 26 on the holding means 24 which substantially comprises first and second support or leg members 44, 45 which extend substantially perpendicularly to the wall region 32 of the hollow body 30. As can be seen in particular from FIG. 6, the support or leg members 44, 45 are of a substantially rectangular cross-section. At their respective ends which are towards the wall region 32 of the hollow body 30, the support or leg members 44, 45 are each provided with an enlarged foot portion 36 of substantially plate-like configuration. The surfaces, which are towards the wall region 32, of the foot portions 36 are pressed against the inside surface, which is still hot and thus plastic, of the wall region 32 of the hollow body 30, at the end of the above-described movement of the components from the position shown in FIG. 2 into that illustrated in FIG. 3, thereby to produce a welded joint between the foot portions 36 and the inside surface of the wall region 32.

Provided in the end portion of each support or leg member 44, 45, which is remote from the respective foot portion 36, is an opening as indicated at 48 and 49 respectively. The opening 48 is of round cross-section and is adapted to the extension 22 which is also of round cross-section over the major part of its longitudinal extent. On the other hand, the end portion 50 of the extension 22 is of a non-round cross-section which can thus form a positive or nonrotatable connection to another component, being square in the present embodiment, and the opening 49 in the support or leg member 45 is matched in its cross-section to the cross-section of the end portion 50 of the extension 22. Thus, the square cross-section of the opening 49 and the end portion 50 provide a positive connection therebetween which prevents a pivotal movement about the longitudinal axis of the extension 22, of the holding means 24 comprising the two support or leg members 44, 45.

The holding means 24 is firstly connected to the additional body 26 in such a way that the two support or leg members 44 and 45 are fitted through the openings 42 in the respectively associated projections 40 and 41, more specifically so that the components assume the relative position with respect to each other, shown in FIGS. 2 through 4. After that the unit consisting of the holding means 24 and the additional body 26 is fitted on to the extension 22 so that the components assume the position shown in FIGS. 1 and 2.

FIGS. 4 and 5 show that the support or leg member 45 is provided at the level of the projection 41 disposed near the bottom portion 34 of the additional body 26 with small rounded projection portions 51 and 52 which, when the components are in the position shown in FIGS. 2 through 4, receive a projection 41 between them and prevent it from moving relative to the support or leg member 45 as long as excessively high force is not applied in a suitable direction to the support or leg member 45 and/or the additional body 26. As at any event the support or leg member 45 will normally comprise thermoplastic material, the material forming the knob-like projection portions 51 and 52 which are integral with the support or leg member 45 is elastically deformable so that, in particular when the projection 41 comprises plastic material, the support or leg member 45 can be guided with the projection portions 51 and 52 through the opening in the projection 41; in carrying out that operation, it is only necessary to apply a somewhat greater force in order to overcome the resistance afforded by the projection portions 51 and 52, by suitably deforming the projection portions and/or the projection 41. A similar consideration also applies in regard to spreading elements 60 which are carried on the respective support or leg members 44 and 45 and which serve as locking means for holding the additional body 26 in position on the support or leg members 44 and 45, after the respectively associated projections 40 and 41 have been moved along the support or leg members 44 and 45 beyond the locking spreading elements 60.

After the unit consisting of the holding means 24 and the additional body 26 has been fitted on to the support element or extension 22, the relative position between the holding means 24 and the additional body 26 is then maintained so that, even after the two support or leg members 44 and 45 of the holding means 24 have been connected to the wall region 32 of the hollow body 30, the additional body 26 is initially held in the position shown in FIGS. 3 and 4. As soon as the joint between the two support or leg members 44 and 45 on the one hand and the inside surface of the wall region 32 of the hollow body 30 on the other hand is strong enough, being a condition which occurs after suitable cooling of the hollow body 30 within the mold 10, the extension 22 can be withdrawn by a suitable axial movement from the two support or leg members 44 and 45 of the holding means 24, in the direction indicated by the arrow 54 pointing downwardly in FIG. 4. When the mandrel 14 can be withdrawn from the mold 10 and thus from the hollow body 30 also depends inter alia on whether the gaseous medium required for treatment of the inside surface of the wall of the hollow body is injected into and removed again from the hollow body 30 through the mandrel 14 or through another feed configuration, for example through the passage 20.

After the treatment has been carried out, the additional body 26 is displaced in the direction indicated by the arrow 56 in FIG. 5 from the position shown in FIGS. 3 and 4 into the FIG. 5 position in which the bottom portion 34 of the additional body 26 bears more or less closely and snugly against the wall region 32 of the hollow body 30. That generally occurs after the sufficiently cooled hollow body 30 has been removed from the blow molding mold 10 which for that purpose has been opened again so that the mold halves 10a and 10b again assume the positions shown in FIG. 1. When the hollow body 30 is a fuel tank, it is generally necessary to cut a wall region indicated at 58 in FIG. 3 to provide an opening, the general location of which is indicated diagrammatically by a pair of phantom lines 58(a), which is opposite the wall region 32, to provide an opening through which the additional body 26 is easily accessible. For the purposes of producing the movement in the direction of the arrow 56 in FIG. 5, it is again necessary to apply a force which is sufficient to overcome the resistance afforded by the projection portions 51, 52 and locking spreading elements 60 on the support or leg members 44 and 45.

In order to secure the additional body 26 in its second position which is shown in FIG. 5 and which represents its final position, the two support or leg members 44 and 45 carry the above-mentioned deformable locking spreading elements 60 which are of a barb-like configuration as can be clearly seen from FIGS. 4 and 5. Attention will therefore now be directed to FIGS. 4 and 5 in regard to the actual configuration of the locking spreading elements 60 in this embodiment, showing that when the additional body 26 is displaced in the direction indicated by the arrow 56 in FIG. 5, the locking elements 60 do not prevent the additional body 26 from moving from its first position into its second position. During that movement, just as in the case of the above-mentioned projection portions 51 and 52, the locking elements 60 also experience a certain degree of elastic deformation. The spreading elements 60 which can also be integral with the respective support or leg members 44 and 45 respectively can also perform a degree of pivotal movement. After the projections 40 and 41 have moved beyond the locking elements 60 on the support or leg members 44 and 45 and the additional body 26 has reached its final position the locking elements 60 which again return to their initial position as shown in FIG. 5 act as abutments to secure the additional body in its final position in which it bears against or is at a small spacing from the inside surface of the wall region 32 of the hollow body 30.

It will be noted at this point that, in a departure from the embodiment illustrated in FIGS. 1 through 6, it is also possible to provide other means for securing the additional body 26 in its respective position on the support or leg members 44 and 45. That may be effected for example by way of frictional forces, in which case then the cross-sectional dimensions of at least one of the two support or leg members 44 and 45 would have to be suitably matched to the dimensions of the openings 42 in the projections 40 and 41 on the additional body 26. The spreading elements 60 may also be molded integrally on the support or leg members 44 and 45, for example by an injection molding procedure. A similar consideration also applies in regard to the projections 51 and 52.

In the embodiment shown in FIGS. 1 through 6, the holding means 24 is of a two-part configuration as it comprises the first and second support or leg members 44 and 45 which are connected to the additional body 26 independently of each other and which are disposed outside same.

Referring now however to FIGS. 7 and 8 in which components corresponding to those of the embodiment shown in FIGS. 1 through 6 are denoted by the same reference numeral but increased by 100, the holding means 124 is provided with a base or leg portion 136 of generally star-like configuration, with a plate 162 fixed to the side of the base portion 136, which is towards the rod-like extension 122. The plate 162 is carried by the two support or leg members 144 and 145. The support or leg members 144 and 145 are of a configuration corresponding to that already described above and can be fitted onto the extension 122. In contrast to the embodiment shown in FIGS. 1 through 6 however, in the embodiment of FIGS. 7 and 8 the support or leg members 144 and 145 are disposed within the additional body 126. Consequently, the bottom portion 134 of the additional body 126 must be provided with an opening 135 which is desirably also generally star-shaped, to correspond to the configuration of the base portion 136. The advantage of that generally star-like configuration is that the contact surfaces (see in this connection contact surfaces indicated at 266 in FIG. 10) between the base portion 136 and the inside surface of the wall region 132 of the hollow body 130 are very small in area and in some circumstances are even smaller than in the case of the approximately plate-shaped foot portions 36 of the embodiment shown in FIGS. 1 through 6 so that as a result the wall regions which remain untreated by the reaction medium introduced into the hollow body are also very small in area. Thus, even if hydrocarbons penetrate into those wall portions by way of the base portion 136 which normally also comprises thermoplastic material, the changes caused thereby and in particular swelling of those wall portions are not significant.

The projection portions 151 and 152 on the base portion 136 are also to perform the function of securing the additional body 126 in its first position on the holding means 124, to prevent unintentional displacement thereof. A similar consideration also applies in regard to the spreading elements or locking projections 160 which, when the holding means 124 and the additional body 126 are assembled, are possibly firstly moved into a position which permits the base portion 136 to be passed through the opening 135 in the bottom portion 134 of the additional body 126. In the present embodiment, the boundaries of the star-like opening 135 in the bottom portion 134 of the additional body 126 form the guide means for guiding the additional body 126 while it is displaced from its first position shown in FIG. 7 into its second position in which its bottom portion 134 is at least closely adjacent to or in contact with the inside surface of the wall region 132.

Figure 10:
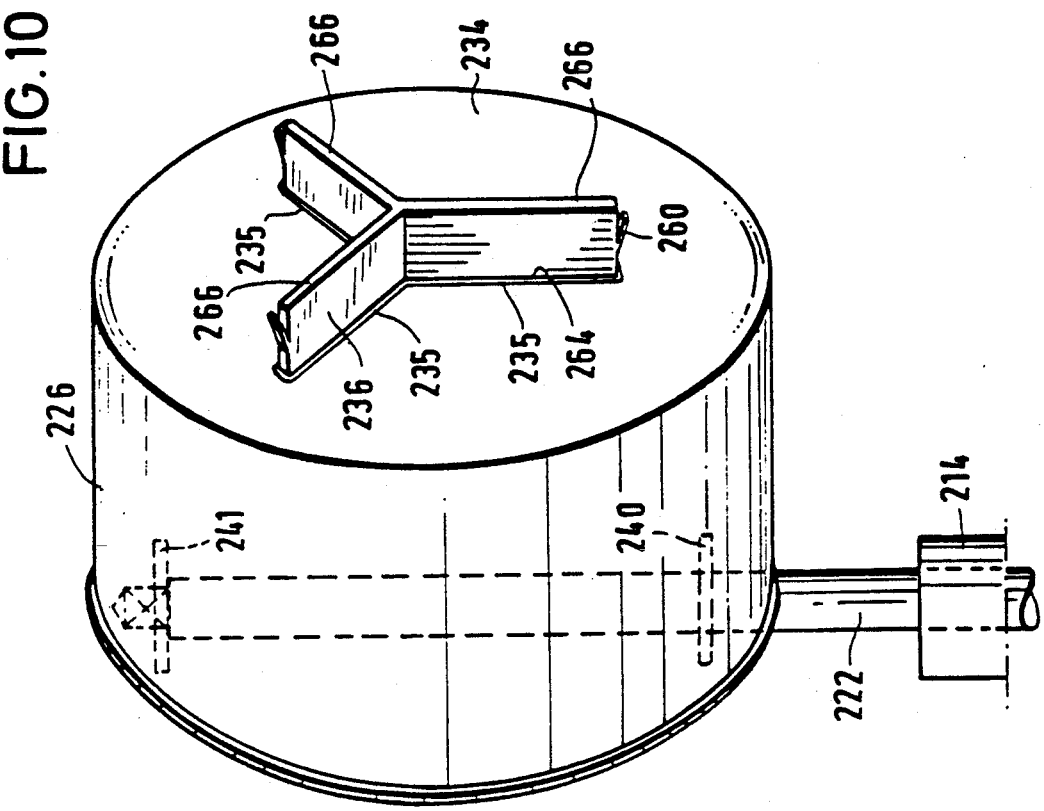
FIG. 10 is a perspective view of the additional body from FIG. 9, and FIGS. 11-14 are each a partly sectional side view corresponding to the views of FIGS. 1-3 of a further apparatus for the production of hollow bodies in four successive stages in the production process.
Figure 9:
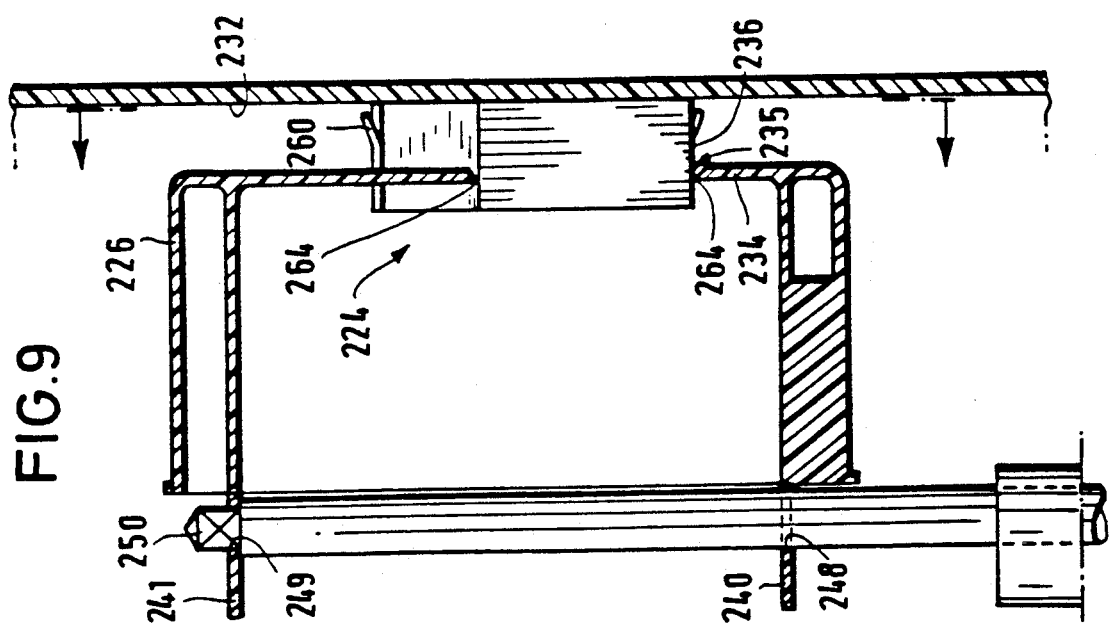
FIG. 9 is a view corresponding to that shown in FIG. 4 of a third embodiment.

Reference is now made to FIGS. 9 and 10 showing a third embodiment in which components corresponding to the embodiment shown in FIGS. 1 through 6 are denoted by the same reference numerals but increased by 200. In this embodiment also, the holding means 224 for connection to the wall region 232 of the hollow body is of a substantially star-shaped configuration so that only the narrow end faces indicated at 266 in FIG. 10 of the star configuration are joined to the inside surface of the wall region 232 and thus cover only correspondingly small portions of the wall region 232. The additional body 226 and the holding means 224 are produced in one piece in the position shown in FIG. 9, for example by an injection molding procedure. The transition 264 from the bottom portion 234 of the additional body 226, to the holding means 224 which passes through the bottom portion 234, is in the form of a desired-rupture location. The latter comes into effect when, after the inside surface of the hollow body has been treated by the treatment medium, the additional body 226 is moved by the application of a suitable force into its second position against or adjacent to the inside surface of the wall region 232 of the hollow body. The desired-rupture location is of such a nature and dimension that, to cause it to rupture, a force has to be applied which is greater than the force needed for routinely welding the base portion 236 to the wall region 232. As this embodiment provides that the holding means 224 is held by the additional body 226 as long as the unit consisting of the holding means 224 and the additional body 226 is held by the extension 222 which serves as a carrier element, the additional body 226 is provided with extension portions 240 and 241 having openings 248 and 249 respectively for the extension 222 to pass therethrough.

FIG. 9 shows the components of this embodiment in positions corresponding to those illustrated in FIG. 3. As in all the other embodiments described herein, in this case also the base portion 236 of the holding means 224 is pressed against the wall region 232 of the hollow body by suitable rotary movement of the mandrel 214 which, as has been seen above, results in a corresponding swivelling movement of the extension or carrier element 222 and thus the necessary displacement of the unit comprising the holding means 224 and the additional body 226.

It will be appreciated at this point that it is also possible to adopt different configurations and/or movements in particular in respect of the extension or carrier element 22, 122 or 222 as described above, for moving the unit consisting of the holding means and the additional body from the position shown in FIG. 2 into the position illustrated in FIG. 3. Thus it is possible for the extension or carrier element 22, 122 or 222 to be mounted on the mandrel 14, 114, 214 pivotably in a plane which extends parallel to the axis of the mandrel, or for the extension or carrier element 22, 122, 222 to be displaced on the mandrel linearly along a diameter thereof. It is also possible for the extension or carrier element to be mounted on another component, that is to say for example a mandrel which does not serve to supply a gaseous treatment medium.

Looking now at FIGS. 11 through 14, the operating procedure involved in that embodiment corresponds in its essential aspects to the procedure involved in the above-described embodiments of FIGS. 1 through 10, so that the same components are also identified by the same reference numerals as those used in FIGS. 1 through 3, but increased by 300.

In regard to the apparatus used, a difference of substance is that the mandrel 314 which is also provided with passages (not shown) for the feed of a pressure medium and the feed of the treatment or reaction medium or gas, carries a rod-like extension 322 which, as illustrated, can be arranged centrally on the mandrel. In this embodiment therefore the extension 322 does not need to perform any pivotal or swivel movement about the longitudinal axis of the mandrel 314 in order for the holding means 324 with the additional body 326 carried thereby to be joined to the inside surface of the wall of the hollow body. On the contrary, the joint between the holding means 324 and the inside surface of the wall of the hollow body is produced by virtue of the closing movement of the blow molding mold portion 310b. For that purpose, the extension 322 is so arranged that the holding means 324 assumes a position in which, at least in the final phase of the closing movement of the mold portion 310b, the foot portions 336 of the holding means 324 come into contact with the inside surface of the wall of the hollow body 330 and are pressed so firmly against the wall surface that a sufficiently firm joint is formed. The mold portions 310a and 310b are different as the mold 310 is not divided into halves. A further difference between the apparatus embodiment illustrated in FIGS. 11 through 14 and the apparatus shown in FIGS. 1 through 3 is that clamping jaws 370a and 370b are additionally provided in the lower region of the mold 310. The clamping jaw 370a is operatively associated with the mold portion 310a while the clamping jaw 370b is operatively associated with the mold portion 310b. The two clamping jaws 370a and 370b are movable independently of the mold portions 310a and 310b. For the sake of clarity of the drawing the drive means for displacement of the clamping jaws are not shown in the drawing.

Finally the apparatus shown in FIGS. 11 through 14 is provided with an additional transportation means 116 by which the preform is removed from the extrusion head (not shown in FIGS. 11 through 14), held and transported into the mold 310 which is in an open condition. An additional transportation means of that kind is used for example when the blow molding mold is arranged in a stationary location and the preform is continuously extruded from the extrusion head. Transportation and holding means of that kind for transporting and holding the preform are routine apparatus configurations and therefore do not need to be described in further detail herein. They may be for example in the form of gripping devices, or of any other suitable design configuration. As their design has nothing to do with the spirit and essence of the present invention, the transportation means is only diagrammatically indicated in FIGS. 11 and 12 and identified by reference numeral 316.

Figure 11:
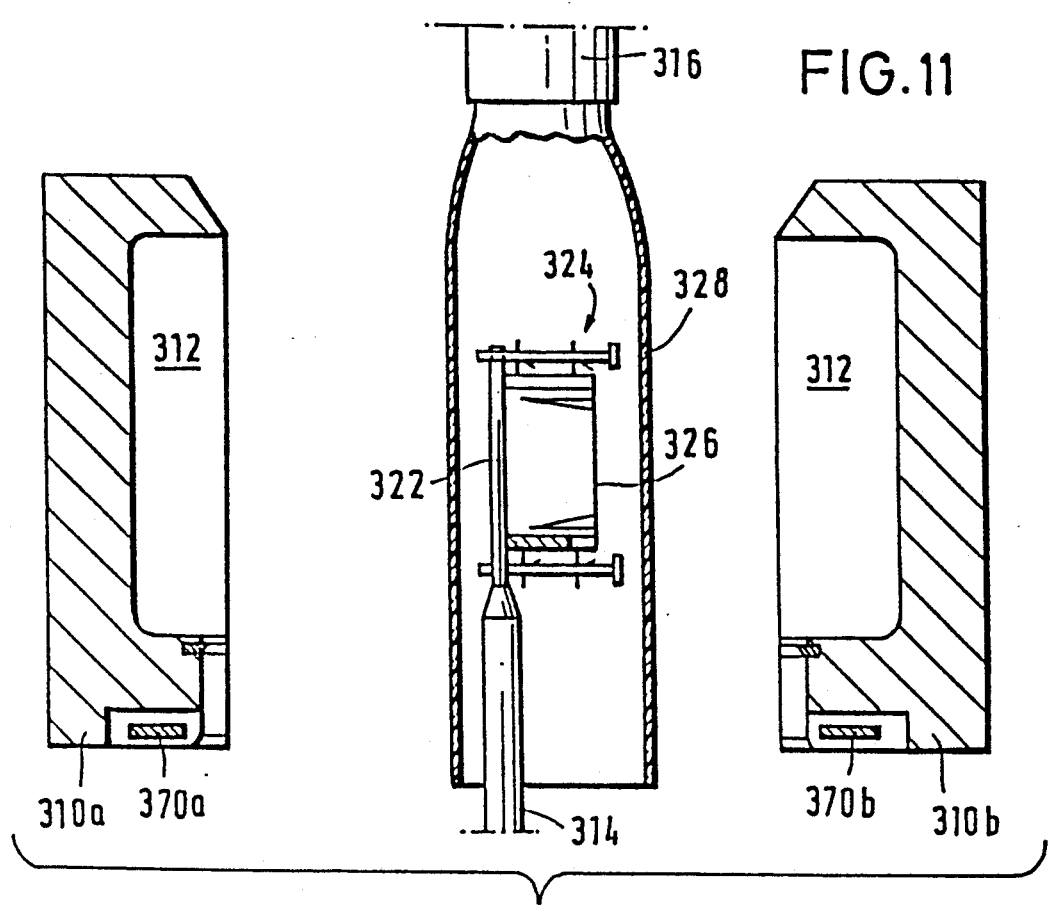
Figure 12:
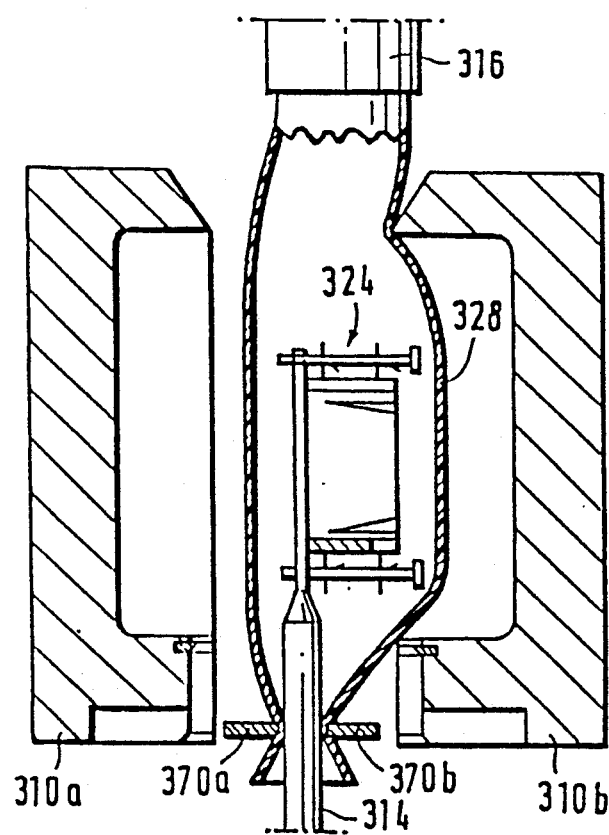
Figure 13:
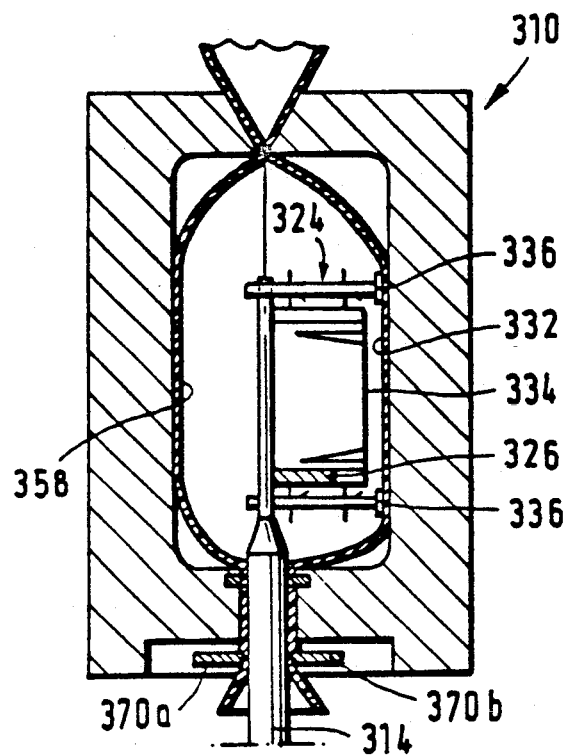

From the starting position shown in FIG. 11 which corresponds to that shown in FIG. 1, the mold portions 310a and 310b are moved in their respective mold-closing directions after the preform 328 has been transported by the transportation means 316 into the correct position between the mold portions 310a and 310b of the mold 310 while in its open condition. In that movement of the mold portions, the clamping jaws 370a and 370b lead the mold portions and, as shown in FIG. 12, press the preform 328 adjacent its lower end against the mandrel 314 and cause it to bear snugly thereagainst, so that the portion of the preform 328 which is disposed above the clamping jaws 370a and 370b when they assume their closed position is already closed off at the bottom before the mold portions 310a and 310b have reached their mold-closing position. Accordingly, it is possible for the preform to be partially expanded by a pressure medium which is supplied through the mandrel 314, prior to the blow molding mold actually being closed. A first phase in that preform expansion operation is shown in FIG. 12. In the course of the further mold-closing movement of the mold portions 310a, 310b, the wall region 332 of the preform 328 is pressed by the inside surface of the mold cavity portion of the mold portion 310 against the foot portions 336 of the holding means 324 which is carried by the mandrel 314 which is not moved in that operation, the pressure involved being sufficient, upon subsequent setting of the material forming the hollow body, to produce a permanent welded joint between the foot portions 336 of the holding means 324 and the wall region 332 of the hollow body. The stage of the process at which the foot portions 336 are in contact with the inside surface of the wall region 332 of the hollow body is shown in FIG. 13 in which the mold 10 is shown in the completely closed condition. Expansion of the preform 328 to produce the hollow body 330 is already substantially concluded at that time so that, in the following stage in the process, all that is involved is for the two upper and lower end regions of the preform to be expanded until they bear against the surface defining the mold cavity in the mold. In actual fact, this alternative form of the process according to the invention, in which expansion of the preform 328 already begins before the mold 310 has been completely closed rather involves producing a change in shape of the preform by virtue of its being embraced by the mold as it closes, as, prior to definitive closure of the mold, the preform 328 may possibly be expanded to a greater degree, at least in parts thereof, than corresponds to the cross-sectional shape of the finished hollow body 330, so that closure of the mold portions means that under some circumstances the preform 328 may even experience a reduction in its cross-section, for example in its middle region, due to the constriction effect applied thereto by the mold as it closes. At any event, the formation of the joint between the holding means 324 and the wall of the hollow body 330 presupposes that in that respect the wall region 332, that is to say the wall region of the hollow body at which the hollow body is joined to the holding means 324, bears against the inside surface of the mold cavity of the mold 310, or, more strictly, the inside surface of the portion of the mold cavity defined by the mold portion 310b, the closing movement of which causes the application of the pressure required to produce the joint between the holding means 324 and the inside surface of the wall of the hollow body.

Figure 14:
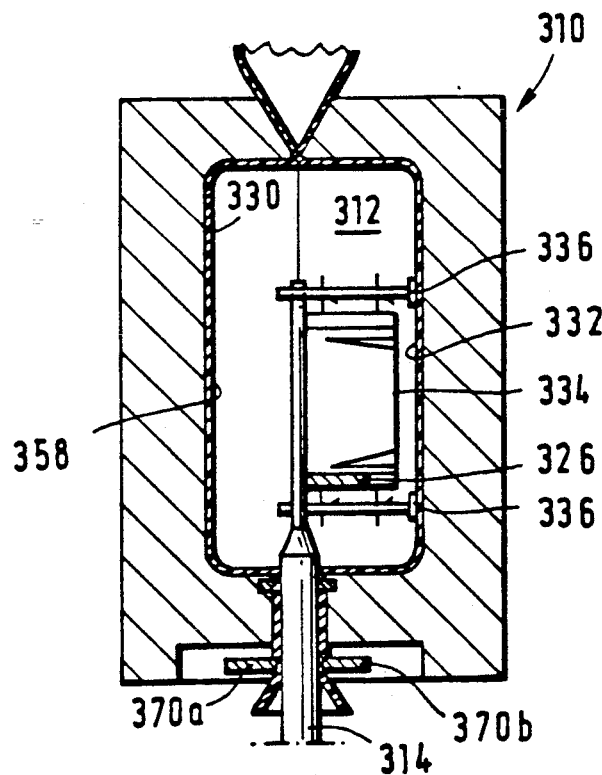

FIG. 14 shows the condition obtaining at a stage in the process in which all wall regions, that is to say including those which are not in contact with the holding means 324, bear against the surface defining the mold cavity in the blow molding mold.

After the treatment of the inside surface of the hollow body has been effected with the reaction medium injected into the hollow body, the additional body 326 is moved into the position illustrated in FIG. 5 in the manner already described above in relation to the other embodiments herein.

It will be appreciated that a common aspect in all the described embodiments is that the wall region of the hollow body which is covered by surface portions of the holding means, for the purposes of producing a sufficiently firm joint between the hollow body and the holding means, is very small in area so that the adverse consequences discussed in the opening part of this specification, due to hydrocarbons penetrating into those regions of the wall of the hollow body, are no longer significant. The increased expenditure in terms of material for the holding means is negligibly low while the fact that the holding means remains in the hollow body after conclusion of manufacture thereof, in addition to the additional body, is also not a disadvantage.

It will also be noted here that, when reference has been primarily made hereinbefore to fluorine as the treatment medium for carrying out the surface treatment to provide for reduced permeability in relation to hydrocarbons or other substances, such reference is not intended to exclude the use of other treatment media. Thus for example the surface treatment operation can also be carried out by a sulphonation treatment.

It will be appreciated that the above-described embodiments have been set forth solely by way of example and illustration of the principles of the present invention and that various modifications and alterations may be made therein without thereby departing from the spirit and scope of the present invention.

What is claimed is:

1. A process for the production of hollow bodies of thermoplastic material by blow molding, comprising: forming a preform having at least one opening; expanding the preform within a blow molding mold by increased internal pressure until it bears against the mold cavity surface of the blow molding mold to form a hollow body; introducing an additional body into the preform, the additional body being disposed on a holding means which is joined to the wall of the hollow body; treating at least a portion of the inside surface of the hollow body with at least one treatment medium with which the plastic material forming regions of the hollow body wall to be treated reacts to change at least one property of the material of the treated regions, wherein the additional body is firstly held in a first position in which it is at a spacing from an adjacent wall region of the hollow body at which it is to be disposed in the hollow body, said spacing being selected to be large enough to permit substantially unimpeded access for the treatment medium to the region between the additional body and the adjacent wall region of the hollow body and after a sufficient period of action of the treatment medium the additional body is displaced relative to the holding means into a second position in which it is at an at least substantially reduced spacing from the wall region of the hollow body to which the holding means is joined, the at least one contact surface area between the holding means and the inside surface of the wall of the hollow body being substantially smaller than the projection of the additional body onto the region of the wall of the hollow body at which the holding means is disposed.

2. A process as set forth in claim 1 wherein said at least substantially reduced spacing of said additional body from said wall region is zero whereby said additional body is in contact with said wall region.

3. A process as set forth in claim 1 wherein said preform is at least substantially tubular.

4. A process as set forth in claim 1 wherein said treatment medium is a constituent of a mixture.

5. A process as set forth in claim 1 wherein said additional body is of a generally pot-like configuration.

6. A process as set forth in claim 5 wherein said additional body has a bottom portion facing towards the wall region of the hollow body to which said holding means is mounted.

7. A process as set forth in claim 1 wherein the wall of the hollow body is provided with an additional opening prior to displacement of the additional body from its first position into its second position on the holding means.

8. A process as set forth in claim 1 wherein said displacement of the additional body from its first position into its second position is effected substantially perpendicularly to the configuration of the wall region of the hollow body to which said holding means is mounted.

9. A process as set forth in claim 1 wherein in its first position said additional body is fixedly connected to said holding means by way of at least one desired-rupture location which is severed upon displacement of said additional body from its first towards its second position.

10. A process as set forth in claim 1 wherein said additional body is held in its first position relative to said holding means by at least one abutment co-operable with a counterpart portion, the locking effect thereof being overcome upon displacement of said additional body from said first position towards said second position by elastic deformation of at least one of said abutment and said counterpart portion.

11. A process as set forth in claim 1 wherein said additional body is held in its second position by at least one securing means which has been subjected to elastic deformation upon displacement of said additional body on said holding means from its first position into its second position.

12. A process as set forth in claim 1 wherein said additional body includes at least one guide means providing a positive connection between said additional body and said holding means by embracing at least a portion of said holding means.

13. A process as set forth in claim 12 wherein said holding means comprises at least first and second support portions and said additional body is displaced from its first position towards its second position in parallel relationship with said support portions.

14. A process as set forth in claim 13 wherein said additional body has at least first and second openings and wherein respective ones of said support portions pass through said openings.

15. A process as set forth in claim 14 wherein said support portions are disposed outside said additional body and said additional body has projections on the outside thereof, said projections providing said openings receiving said support portions.

16. A process as set forth in claim 12 wherein said additional body has a bottom portion having at least one opening, the boundary of which serves as a guide means for guiding the additional body on said holding means.

17. A process as set forth in claim 12 wherein said additional body is of a generally pot-like configuration, wherein said holding means comprises at least first and second support portions disposed within said additional body, wherein said additional body has a bottom portion having at least one opening therethrough, and wherein said at least first and second support portions carry at least one base portion engaging through said at least one opening in the bottom portion of the additional body and connected to the wall of the hollow body.

18. A process as set forth in claim 12 wherein said additional body has a bottom portion having an opening of a star-like configuration therethrough and wherein said holding means has a portion of a corresponding configuration, adapted to be connected to the wall of the hollow body.

19. A process as set forth in claim 1 wherein said holding means and said additional body are carried by a support element during expansion of said preform and until said holding means is mounted to said wall of the hollow body, said support element projecting through the opening of the preform into the interior thereof.

20. A process as set forth in claim 19 wherein said support element comprises a portion of non-round cross-section and said holding means has a correspondingly defined opening receiving said portion of said support element, thereby to produce a positive connection between the support element and the holding means.

21. A process as set forth in claim 19 wherein said support element has a portion of non-round cross-section and said additional body has a correspondingly defined opening receiving said portion of said support element, thereby to produce a positive connection between the support element and the additional body.

22. A process as set forth in claim 19 wherein said holding means and said additional body are moved by a movement of the support element from a first position in which the holding means and the additional body are without contact with the preform into a second position in which the holding means is joined to the wall of the hollow body, a joint between the holding means and the hollow body being produced in the course of said movement.

23. A process as set forth in claim 19 wherein said support element is of a rod-like configuration.

24. A process as set forth in claim 19 wherein said additional body has at least one opening and wherein said support element engages through said at least one opening.

25. A process as set forth in claim 19 wherein said holding means has at least one opening and wherein said support element engages through said at least one opening.

26. A process as set forth in claim 1 wherein said holding means is joined to the wall of said hollow body in the course of the closing movement of the blow molding mold.

27. A process as set forth in claim 1 wherein said holding means comprises thermoplastic material and is joined to the wall of the hollow body by welding.

28. A process as set forth in claim 1 wherein said treatment of at least a portion of the inside surface of the wall of the hollow body in the expanded condition with said medium is effected within the blow molding mold.

29. A process as set forth in claim 1 wherein said treatment of at least a portion of the inside surface of the wall of the hollow body in the expanded condition with said medium is effected after the hollow body has been removed from the blow molding mold.

30. A process as set forth in claim 29 wherein the inside surface of the wall of the hollow body is heated prior to said treatment at least in regions which are to be treated with said medium.

31. A process as set forth in claim 1 wherein the additional body is displaced into its second position while the hollow body is still in the blow molding mold.

32. A process as set forth in claim 1 wherein the additional body is displaced into its second position after the hollow body has been removed from the blow molding mold.

* * * * *